(12) United States Patent (10) Patent No.: US 8,990,388 B2
Ebrahim et al. (45) Date of Patent: *Mar. 24, 2015

(54) IDENTIFICATION OF CRITICAL WEB SERVICES AND THEIR DYNAMIC OPTIMAL RELOCATION

(75) Inventors: Nasser Ebrahim, Bangalore (IN); Sreekanth Ramakrishna Iyer, Bangalore (IN); Gireesh Punathil, Bangalore (IN); Riju Reghunath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,788

(22) Filed: Sep. 15, 2012

(65) Prior Publication Data

US 2013/0013774 A1 Jan. 10, 2013

Related U.S. Application Data

(63) Continuation of application No. 12/945,811, filed on Nov. 12, 2010.

(51) Int. Cl.
*H04L 29/06* (2006.01)
*H04L 12/24* (2006.01)
*H04L 12/26* (2006.01)
*G06F 11/34* (2006.01)
*G06F 11/20* (2006.01)

(52) U.S. Cl.
CPC ........ *H04L 41/0663* (2013.01); *H04L 43/0817* (2013.01); *G06F 11/3433* (2013.01); *G06F 11/2023* (2013.01); *G06F 11/3409* (2013.01); *G06F 2201/81* (2013.01); *G06F 2201/875* (2013.01)
USPC ............................ 709/224; 709/226; 709/238

(58) Field of Classification Search
USPC .......... 709/224, 226, 238, 239; 370/232, 230, 370/462
See application file for complete search history.

(56) References Cited

U.S. PATENT DOCUMENTS 6,182,139 B1 * 1/2001 Brendel ........................ 709/226
6,463,454 B1 10/2002 Lumelsky et al.
(Continued)

FOREIGN PATENT DOCUMENTS

WO WO 0114961 A2 3/2001

OTHER PUBLICATIONS

McCune, et al.; Shamon: A system for Distributed Mandatory Access Control; pp. 1-10; IBM Research.
(Continued)

*Primary Examiner* — Ian N Moore
*Assistant Examiner* — Hien Nguyen
(74) *Attorney, Agent, or Firm* — Brevetto Law Group

(57) ABSTRACT

A web service executing on a web server is monitored by detecting metadata generated for various performance characteristics of the web service. A relocation policy is consulted in response to detecting the performance characteristics exceeding a first predetermined threshold. The relocation policy specifies a target web server as a new location for the web, and instructions for relocating the web service to the target web server if the performance characteristics exceeding a second predetermined threshold. The web service is relocated to the target web server based on the relocation policy and without human intervention.

14 Claims, 5 Drawing Sheets

(56) References Cited

U.S. PATENT DOCUMENTS

| | | | |
|---|---|---|---|
| 6,957,433 B2 | 10/2005 | Umberger et al. | |
| 6,993,762 B1 | 1/2006 | Pierre | |
| 7,062,570 B2 | 6/2006 | Hong et al. | |
| 7,146,505 B1 | 12/2006 | Harada et al. | |
| 7,503,047 B1 | 3/2009 | Richter | |
| 7,673,110 B2 | 3/2010 | Yamamoto et al. | |
| 8,244,827 B2 | 8/2012 | Abrams | |
| 2001/0034743 A1 | 10/2001 | Thomas | |
| 2002/0004844 A1* | 1/2002 | Harari et al. | 709/238 |
| 2002/0062288 A1 | 5/2002 | Ooishi | |
| 2002/0069369 A1 | 6/2002 | Tremain | |
| 2002/0083003 A1 | 6/2002 | Halliday et al. | |
| 2003/0088529 A1* | 5/2003 | Klinker et al. | 706/3 |
| 2003/0110242 A1 | 6/2003 | Brown et al. | |
| 2003/0135474 A1 | 7/2003 | Circenis et al. | |
| 2003/0144894 A1 | 7/2003 | Robertson et al. | |
| 2004/0162901 A1 | 8/2004 | Mangipudi et al. | |
| 2004/0205772 A1 | 10/2004 | Uszok et al. | |
| 2005/0038708 A1 | 2/2005 | Wu | |
| 2005/0050228 A1 | 3/2005 | Perham et al. | |
| 2005/0086330 A1 | 4/2005 | Perham et al. | |
| 2005/0228618 A1 | 10/2005 | Patel et al. | |
| 2005/0251802 A1 | 11/2005 | Bozek et al. | |
| 2006/0168122 A1* | 7/2006 | Acharya et al. | 709/219 |
| 2006/0206891 A1 | 9/2006 | Armstrong et al. | |
| 2006/0224741 A1 | 10/2006 | Jackson | |
| 2007/0083639 A1 | 4/2007 | Gilbert et al. | |
| 2007/0088794 A1 | 4/2007 | Akins et al. | |
| 2007/0094364 A1 | 4/2007 | Oberhauser | |
| 2007/0112948 A1 | 5/2007 | Uhlik et al. | |
| 2007/0150610 A1 | 6/2007 | Vassilev et al. | |
| 2008/0082569 A1 | 4/2008 | Mansour et al. | |
| 2008/0115129 A1 | 5/2008 | Hintermeister et al. | |
| 2008/0120705 A1 | 5/2008 | Beyer | |
| 2008/0155557 A1 | 6/2008 | Bezrukov et al. | |
| 2008/0172458 A1 | 7/2008 | Middleton | |
| 2008/0172496 A1 | 7/2008 | Middleton | |
| 2009/0077210 A1 | 3/2009 | Musman et al. | |
| 2009/0187654 A1* | 7/2009 | Raja et al. | 709/224 |
| 2009/0207731 A1* | 8/2009 | Carlson et al. | 370/232 |
| 2010/0094981 A1 | 4/2010 | Cordray et al. | |
| 2012/0124193 A1* | 5/2012 | Ebrahim et al. | 709/224 |
| 2012/0215910 A1 | 8/2012 | Wada | |
| 2012/0270567 A1 | 10/2012 | Johnson | |

OTHER PUBLICATIONS

Umeno, et al.; Development of Methods for Reducing the Spins of Guest Multiprocessors; Joho Shori Gakkai Ronbun Shi (Transactions of the Information Processing Society of Japan); Mar. 1995; pp. 681-696; vol. 36, No. 3.

Wood, et al.; Black-box and Gray-box Strategies for Virtual Machine Migration; pp. 1-14.

Hill; Storage & Servers; Network Computing; Dec. 2006; pp. 39-46; vol. 17, No. 26; CMP Media Inc.; USA.

Schahram Dustdar and Lukasz Juszczyk; "Dynamic Replication and Synchronization of Web Services for High Availability in Mobile Ad-hoc Networks"; research paper; (unknown date); Vienna University of Technology, Argentinierstrasse 8/184-1, A-1040 Wien, Austria.

Beda Christoph Hammerschmidt and Volker Linnemann; "Migrating Stateful Web Services Using Apache Axis and P2P"; (unknown date); Institute for Informations Systems University of Lübeck, Germany.

Hiyam S. Ensour and Ahmad Kayed; "Web Server Performance Evaluations under Workloads with Different Parameters"; (2008); European Journal of Scientific Research, ISSN 1450-216X vol. 22 No. 2 (2008), pp. 251-268, © EuroJournals Publishing, Inc. 2008.

Neeraj Nehra, R.B. Patel and V.K. Bhat; "A Framework for Distributed Dynamic Load Balancing in Heterogeneous Cluster"; Journal of Computer Science 3 (1): 14-24, 2007, ISSN 1549-3636, © 2007 Science Publications.

Dennis Pratistha, Arkady Zaslavsky, Simon Cuce and Martin Dick; "Performance Based Cost Models for Improving Web Service Efficiency Through Dynamic Relocation"; E-Commerce and Web Technologies, Lecture Notes in Computer Science, 2005, vol. 3590/2005, 248-257, DOI: 10.1007/11545163_25 (only Abstract available).

Sonntag, M.; "Agents as Web Service Providers: Single Agents or MAS?"; Applied Artificial Intelligence; vol. 20, No. 2, pp. 203, Abstract (2006).

\* cited by examiner

IDENTIFICATION OF CRITICAL WEB SERVICES AND THEIR DYNAMIC OPTIMAL RELOCATION

CROSS-REFERENCE TO RELATED APPLICATIONS

This application is related to, claims priority from, and hereby incorporates by reference in its respective entirety U.S. patent application Ser. No. 12/945,811.

BACKGROUND

1. Technical Field

Various embodiments of the present invention relate to software code accessible via a network such as the Internet, and more specifically, to systems for dynamically relocating web services.

2. Description of Related Art

A web service is an application function or software system exposed by a well defined interface that can be used as a reusable component in a business process, for example, an application programming interfaces (API). Web services typically use web-related standards to interact with other systems, for example, Hypertext Transfer Protocol (HTTP). A web service is a self contained function whose definition can be discovered by another software system. In an enterprise there are often many web services deployed on assigned infrastructure maintained in a data center. Many internal and external applications access these web services over the network. Typically application operations team is responsible for deploying and managing these web services to ensure that they meet their promised Service Level Agreements (SLA).

Web service invocations may be dynamic in nature, varying with time, situation and location. There can be demand for a particular service during certain situations, from a particular location or for a particular period of time, or a combination of these factors. Such web services may be hot in terms of number of invocations or critical in terms of meeting the Quality of Service (QoS) like availability, response times, or other performance measures.

BRIEF SUMMARY

Various embodiments disclosed herein provide methods for relocating a web service from a first server to a second server. Parameters of the web service are monitored while the web service executing on a first server. If a status change is detected based on a change in the monitored parameters from normal status level to a first status level (or "warm" status level), the system consults a relocation policy for instructions on moving the web service. If the status increases from the first status to a second ("hot") status level the system relocates the web service to a second target server and reroutes ensuing requests for the web service to the second server.

BRIEF DESCRIPTION OF THE DRAWINGS

The accompanying drawings, which are incorporated in and constitute part of the specification, illustrate various embodiments of the invention. Together with the general description, the drawings aid in explaining the principles of the invention. In the drawings.

DETAILED DESCRIPTION

Various embodiments disclosed herein involve the identification of hot or critical operation of a given web service, and the dynamic, optimal relocation of the web service to another defined infrastructure in order to better meet the specified service requirements. In the inventors' experience enterprise application servers that host web services typically load balance by replicating the work load across a cluster of servers. In many such situations, the 80:20 factor may be applicable to web service invocations. That is, approximately 20% of the web services will be responsible for 80% of server work load. In such situations there may be no need to replicate the entire web services which consume more resources, such as CPU, memory and power consumption, and take more service start up time.

IBM's Tivoli product is a composite application manager for service oriented architecture (SOA) suitable for monitoring and managing web services usage. Other available tools include Websphere Enterprise Service Bus (ESB) and Websphere Service Repository and Registry (WSRR). These tools can manage service metadata, route service requests, and provide monitoring, ESB and Repository and Registry functions. But the present inventors recognized that these tools do not adequately support the concept and framework for relocation to meet the service demands. None of them provides capabilities to relocate based on service usage and SLAs.

Figure 1:
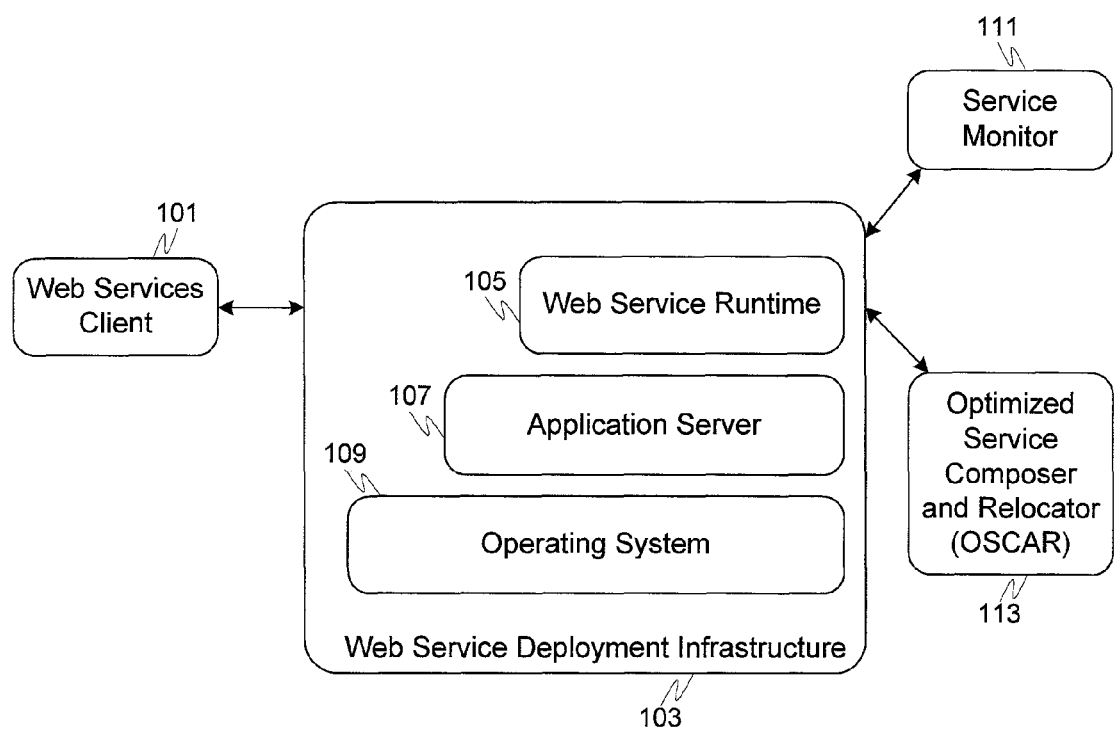
FIG. 1 depicts a web service deployment infrastructure and monitoring system 100.
Figure 2:
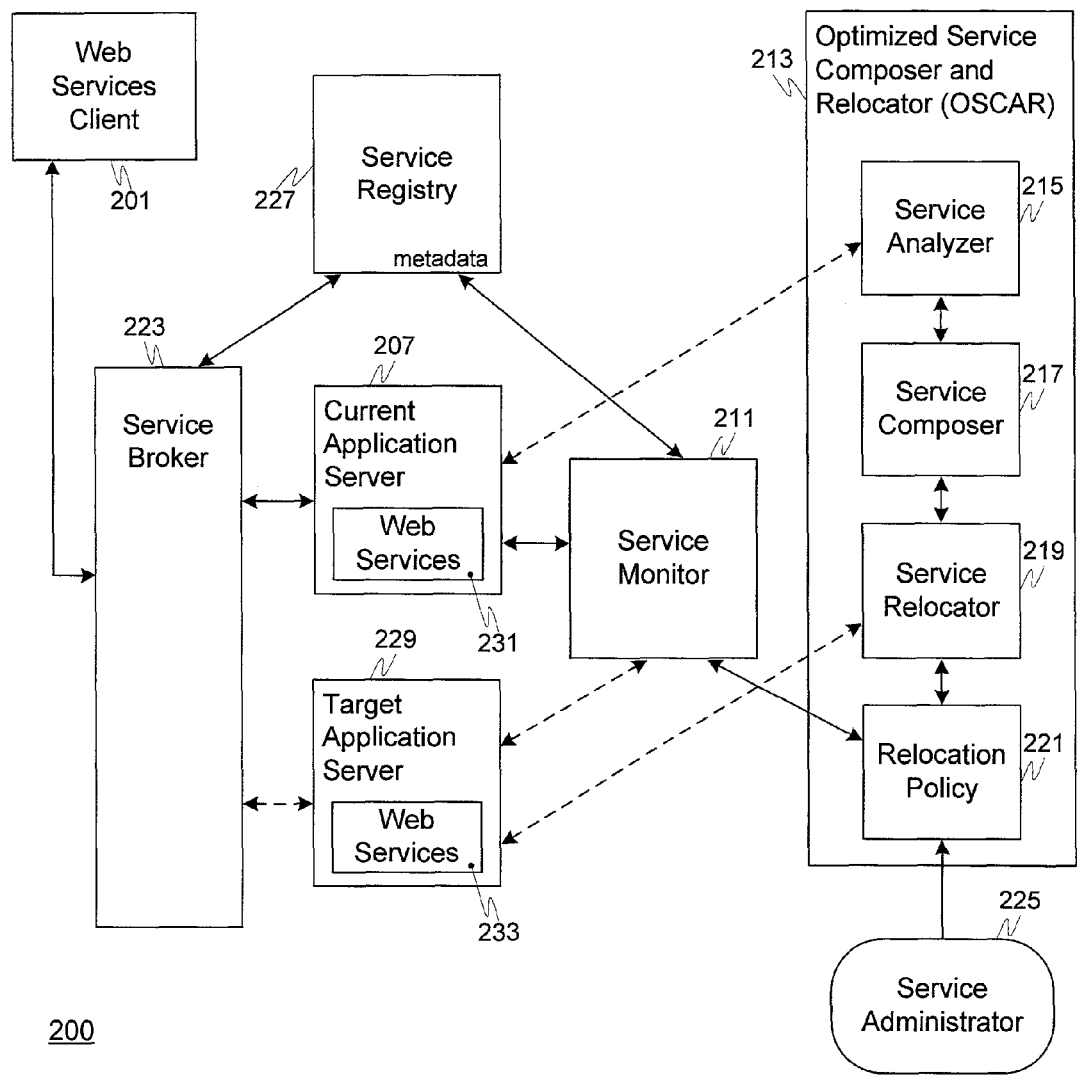
FIG. 2 depicts a web service deployment infrastructure and monitoring system 200 with details about interaction between various components.

FIGS. 1 and 2 depict two views of a web service deployment infrastructure and monitoring system on which the various embodiments may be implemented. Various embodiments disclosed herein identify hot and/or critical web service operation, and take steps to dynamically relocate the web service to another, more optimal, location in the infrastructure. The various embodiments feature components that perform a number of activities and tasks. The system may include one or more admin servers configured to include system components for performing various activities of the methods described herein. For example, one or more system components create and update metadata related to service deployment, execution and relocation. Metadata may be thought of as data that characterizes or otherwise provides information about data. System components also monitor services for identification of hot and critical operations. The system includes a mechanism for specifying the policy for relocation of hot and critical operation. An optimized service composer and relocator (OSCAR) packages the required service components and deploys them on the target infrastructure. OSCAR leverages service and service implementation metadata which is initially created during service deployment and constantly updated during service execution to identify runtime dependencies. The system further includes a mechanism for routing further requests for hot and critical service to the relocated service destination. In the event of the relocated service invocation fails, the system includes a mechanism to fall back to original service.

The various embodiments, upon being implemented, allow for dynamic and optimized service relocation, thus providing easy deployment and management of hot and critical web services. The further optimized deployment aids in better, more efficient server resource usage contributing to green environment. The system provides means to specify relocation policies based on service usage patterns which minimizes the need for human intervention. For the monitored service, a Service Administrator can specify whether the relocation policy is to be applied at the service level or the operations level. Depending on the policy settings, OSCAR may be configured to relocate only the required operations of a service by carefully inspecting the service usage. OSCAR typically relocates only the required operations of a service by carefully inspecting the service usage. This helps reduce the resource footprint in the target infrastructure as well as improving bring up time for services. This system can be used for addressing many day-to-day challenging operational activities like infrastructure/software upgrades, and restoration of critical services in high availability/disaster recovery, or the like. The same also applies to situations in which a server is going down. Very critical operations alone can be restored dynamically and optimally to another server within the cluster. If a server is not responding better to meet SLA, critical services alone can be relocated. Various embodiments allow the system to be integrated with existing tools like ITCAM (IBM Tivoli Composite Application Manager), WSRR (WebSphere Registry and Repository), and IBM offerings for the Enterprise Service Bus (ESB) such as WMB (WebSphere Message Broker), WESB (WebSphere Enterprise Service Bus), DataPower, or other such tools or conventional software management systems known to those of ordinary skill in the art.

Turning to FIG. 1, web services are deployed in a web service run-time environment 103 such as that shown in the figure. Such environments may be monitored for service availability, performance and other service characteristics using monitoring tools. In FIG. 1 the web services client 101 is a program that makes a service request to server 103, another program that fulfills the service request. The web services client 101 and server 103 may, in some instances, execute on the same computer platform. Typically, however, web services client 101 and server 103 are located on different computing platforms remote from each other. Web service runtime 105 is an environment suitable for executing the web service. For example, for Java web services, Java runtime environment (JRE) software provides a runtime environment in which Java programs can be executed.

The application server 107 is the server program that provides the logic for an application program to execute the requested web service. The application server 107 may be configured as part of a three-tier application that includes a graphical user interface (GUI) server, an application server, and a database/transaction server. Operating system 109 may be thought of as a program that runs other programs. The operating system 109 regulates the manner in which an application program such as a web service uses the computer's hardware and resources.

The service monitor 111 monitors one or more services for availability and performance characteristics. IBM's Tivoli may be configured to perform monitoring activities of the service monitor 111. OSCAR 113 is the Optimized Service Composer And Relocator. OSCAR 113 works in combination with existing service monitoring tools to monitor service performance and availability and relocate them for a given set of web service containers. OSCAR 113 may be configured to relocate web services to a predefined target environment in response to detecting a specified condition by the monitoring tool in response to the relocation policy for a given situation.

FIG. 2 depicts a view of a web service deployment infrastructure and monitoring system 200 containing some details about interaction between various components. As part of the solution, the service administrator 225 can specify a relocation policy 221 along with instructions and information concerning the specifics of web service deployment. The relocation policy 221 typically includes all the criteria for web service relocation including the parameters to be monitored for gauging the performance of the web service and determining whether it should be moved. For example, a set of operations of a particular a web service 231 can be considered as a candidate for relocation, based on monitoring any number of criteria or parameters taken singly or in combination that are affected by service demands. Such criteria or parameters may include the number of invocations in a predefined time period, or various other measurements or parameters associated with the Quality of Service (QoS) or service level agreement (SLA). These measurements or parameters may include the availability, response times, web service performance, or the like parameters for gauging the performance of the web service. The number of invocations (or other criteria/parameters) may be measured in any predefined time period ranging from a millisecond or less to a week or more, or any range in between, depending upon the nature of the criteria or parameter being measured. Along with the criteria, the service administrator 225 can also specify the target location 229 for the web service for each criterion. The relocation policy 221 generally contains details on when and where a web service should be relocated, or the desirability of relocating a web service to any of several new location choices.

In accordance with various embodiments of the web service deployment infrastructure and monitoring system 200, upon detecting a predefined situation specified in the relocation policy 221 the service monitor 211 updates the service metadata in a registry 227, which in turn, notifies the OSCAR system 213 since OSCAR received metadata pertaining to a predefined set of web services. For example, when an operation is tagged as WARM (e.g., a first status) by the monitor tool in the service registry 227, the Service Analyzer component 215 of OSCAR 213 analyzes that service and identifies the resources that need to be relocated for that operation. This information is updated as a metadata against the service in the registry 227. If the service is later detected as HOT (e.g., a second status) by the monitoring tool, the Service Composer component 217 of OSCAR 213 composes and packs the resources needed for relocation of the service. Once the service package is ready for relocation, the Service Relocator component 219 deploys the package to the target infrastructure, as specified in the relocation policy 221. Upon completing the relocation deployment the Service Registry 227 is updated to reflect the status (RELOCATED).

The Service Broker 223 can then leverage this service metadata to redirect client requests to the new destination. In case of any failure with the optimized relocated service 233, the pattern can also be designed to fall back to original service 231 for redundancy as well as fault tolerance. That is, the web service can revert back to its original server location in the event the newly deployed web service fails.

The relocation policy 221 contains details that aid in implementing the service relocation. The relocation policy 221 is typically configured as a component of the OSCAR module 213, but may be located elsewhere in the system 200, depending upon the specifics of the implementation. The relocation policy 221 file can be implemented using XML. The relocation policy 221 contains thresholds specifying details that help the Service Monitor 211 to detect whether the Service 231 has become eligible for relocation. The format supports way to provide details for detecting a service to be WARM as well as HOT. That is, the relocation policy 221 may contain a threshold for WARM, and another threshold for HOT.

The relocation policy 221 also contains activities and parameter pertaining to a relocation action which is the relocation action (or actions) to be taken when a threshold is met or a situation is detected. Another piece of information contained in the relocation policy 221 concerns the target infrastructure. In particular, the relocation policy 221 includes information on where the service should be relocated to. The user 225 can specify details of the target infrastructure, host details, application server and web service run-time details. The target infrastructure may, in some instances, be specified as a cloud or grid infrastructure location. The relocation policy 221 may include other data related to relocation. For example, the relocation policy 221 may include logic specifying a service failover policy to be implemented after relocation. According to the failover policy, if the service invocation fails with the new server 229 then requests are again routed to the original server 207.

The service monitor 211 is another component of the deployment infrastructure and monitoring system 200. The service monitor 211 can, in some implementations, be configured from an industry standard tool for monitoring services and service infrastructure, including for example, the IBM Tivoli Composite Application Manager (ITCAM) for SOA, WebSphere which can monitor whether conditions specified in policy files are met. The service monitor 211 monitors updates of the service metadata ins service registry 227 based on observed characteristics like service invocation, resource utilization, or other like parameters.

The service analyzer 215 may be configured as a component of OSCAR 213. Once a service 231 is detected as WARM, the service analyzer 215 analyzes the service 231 to determine what resources are being used by the service 231 that may need to be moved in case the service 231 turns HOT. Service analyzer 215 may be implemented in a manner like a profiling tool that can be extended to do static as well as dynamic analysis to provide the list of resources for a service. For example, in case of a web service 231 implemented using Java classes, the service analyzer 215 can typically provide the list of most widely used operations and the associated Java classes and/or methods that may be required to fulfill that function.

The service composer 217 is also typically configured as part of OSCAR 213. Service composer 217 is responsible for packaging the resources for relocation. Service composer 217 can leverage the data provided by the service analyzer 215 to optimally package a web service 231 determined to be HOT for relocation. An advanced version of service composer 217 performs method level stripping from the class files to create a highly optimized package for relocation. The service relocator 219 deploys the optimized package provided by composer on to the target infrastructure 229 specified in the relocation policy file 221.

The service registry 227 keeps the metadata related to various web services, e.g., web service 231. Service registry 227 may also be used for storing information related to relocation as well as storing details of the resource usage by a service. A number of industry standard registry services, including products like WebSphere Service Registry and Repository, may be configured to perform registry activities supporting the various embodiments including the following. Service metadata may include any number of different status indications. For example, a typical set of status indication could include the following Service Relocation Status of NORMAL, WARM, HOT, and RELOCATED. In some implementations these status indication are known by different terms such as normal status level, first status level, second status level, and relocated status level. Other status indication may be provided in terms of numerical ranges or ratings, or other such indicators based on formulas derived from operation parameters. Service registry 227 is generally configured to store and track service resource usage metadata including the list of operations, the list of classes and methods that are essential for HOT services. This data may be updated by service analyzer 215. Another category of metadata collected by service registry 227 includes metadata related to the relocated service. The service relocator 219 creates this data in the registry 227 so that the service broker 223 can use it to redirect client 201 requests following the relocation.

The system 200 of FIG. 2 may also be configured to include a service broker 223. Industry standard middleware like the WebSphere Enterprise Service Bus or WebSphere Message Broker can be configured to leverage the information posted in registry 227 by OSCAR 213 and do dynamic service routing to relocated services 233. A mediation module deployed on the service broker 223 can detect whether the service is in "RELOCATED" status and accordingly redirect any new client request to the new host 229. The relocation policy 221 may also be configured to provide advance failover and routing rules. Such rules specify, for example, that if an optimized "RELOCATED" service fails, the mediation module or service broker 223 can redirect the request to the original host or service provider.

Figure 3:
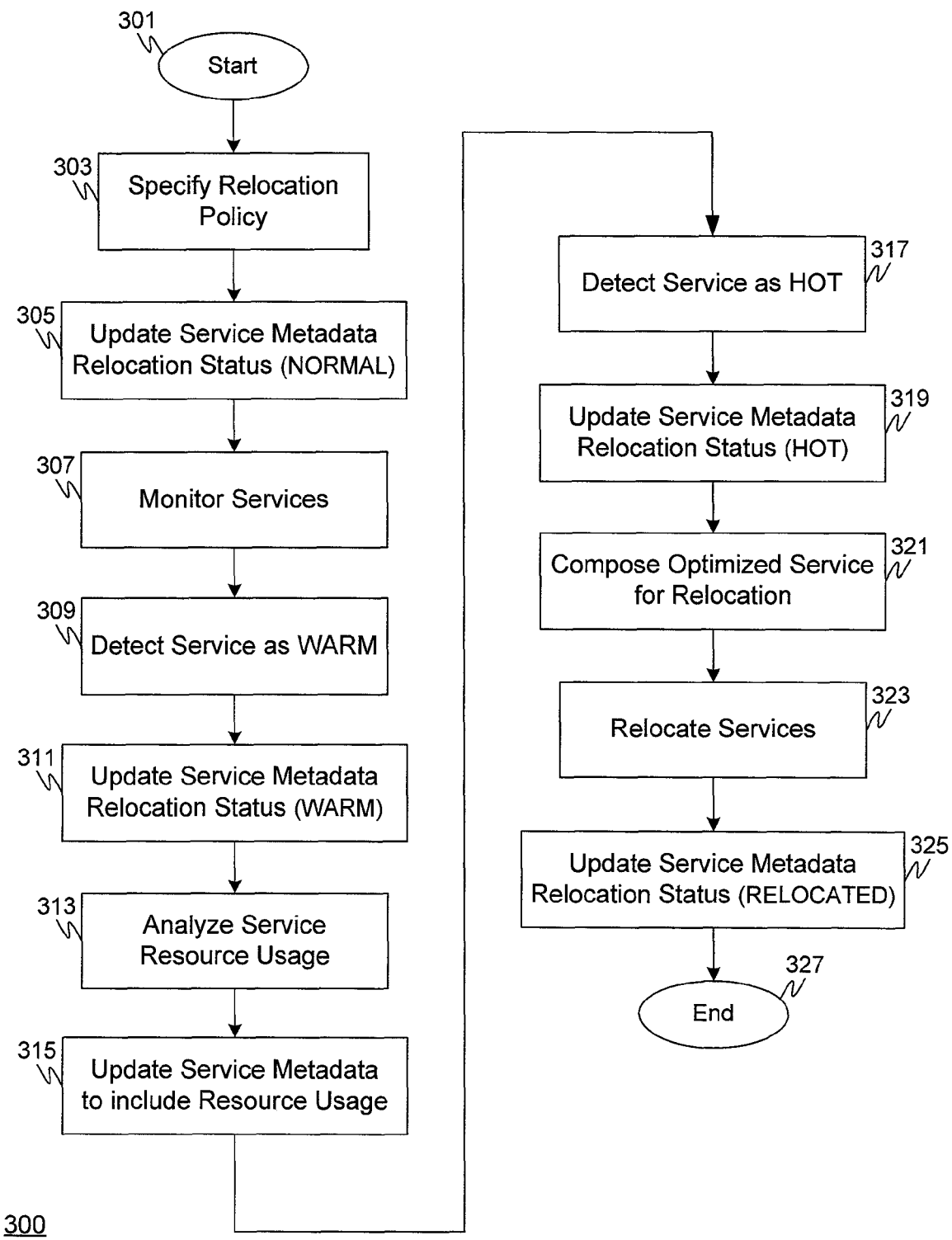
FIG. 3 is flowchart of example activities carried out in moving a web service from one server to another in accordance with various embodiments.

FIG. 3 is flowchart 300 of example activities carried out in moving a web service from one server to another. The process begins at 301 and proceeds to 303 to specify a relocation policy. The relocation policy may be stored as part of, or in a location accessible by, the optimized service composer, e.g., OSCAR 213 of FIG. 2. The relocation policy typically contains one or more thresholds that indicate whether the web service is eligible for relocation. The thresholds may be related to services, applications, middleware, or the operating system itself. The sample thresholds include, but are not limited to, information on service flows such as invocation count/pattern of Web Services, Web Application Server Performance, statistics on messaging infrastructure and message flows at the services layer, real-time status on the availability and performance of infrastructure like status of servers, queues, queue managers, channels, or other like parameters. A threshold may pertain to the volume of communication traffic, the quality of service (QOS), or the memory usage of the server on which the web service resides. A number of different parameters may be used for the thresholds, including for example, the CPU run queue, input/output (I/O) wait times, initiation of random access memory (RAM) swapping operations, read/write request wait times, percent of available servers being used, or other like measures or parameters that can gauge an impending bottleneck situation. The threshold(s) may be based solely on one of these or other parameters, or may be based on a combination of usage parameters.

Typically, there are two thresholds, the WARM threshold and the HOT threshold. A web service operating below the WARM threshold is in the NORMAL status. The services may be categorized as WARM when the WARM threshold is reached, for example, one of the parameters mentioned above. The services could also become WARM when it is nearing a maintenance window (time) when it is required to be relocated to another server. Once the WARM threshold is exceeded the web service is then categorized in the HOT status. Upon exceeding the HOT threshold the web service status is changed to HOT. On the other hand, if the status is currently WARM and the usage level decreases the status may go back to NORMAL. In some embodiments the system may require that a parameter (or combination of parameters) be exceeded for a predetermined amount of time before the status is upgraded to the next highest level. This reduces the chances of a parameter spiking temporarily above the threshold level and possibly causing a web service migration that is not warranted.

In block 305 the metadata is updated to set the relocation status at NORMAL. This indicates that the web service is being run out of its normal, or default location. In some implementations this means that there is no earlier location to revert to. The NORMAL relocation status may be for a location that had previously been new, but is now considered the normal or default location. The method proceeds to block 307 to monitor web services operations. In block 309 the system detects that the WARM threshold has been exceeded. In response, in block 311 updates the metadata to reflect the relocation status as WARM.

In block 313 the system analyzes the service resource usage. Depending upon the specifics of the implementation, the analysis may be performed by the OSCAR 213 unit, for example, in the service analyzer 215, or by the service monitor 211, or other unit designated for analysis. The method proceeds to 315 where the web service metadata is updated to reflect resource usage, for instance, as detected in the analysis of resource usage. In the example process depicted in FIG. 3 the web service is detected as being HOT in block 317. This occurs when the usage level or other web service usage parameter exceeds the HOT threshold as specified in the relocation policy. The method proceeds to 319 where the web service metadata status is updated to HOT.

In block 321 the web service is prepared for relocation. It may be the case that the web service being moved depends upon or utilizes other web services. In such instances multiple web services may need to be moved, or copied, to the new location in order to ensure proper operation of the web service. This may be determined as part of creating the optimized web service for relation by reference to the relocation policy. Once the composing of the optimized web service is completed in block 321 the method proceeds to 323 to relocate the service (or services). Upon completing the relocation the method updates the web service metadata in block 325 to reflect the status of RELOCATED. Requests for the web service are then routed to the new web service location. The method ends in 327.

Figure 4:
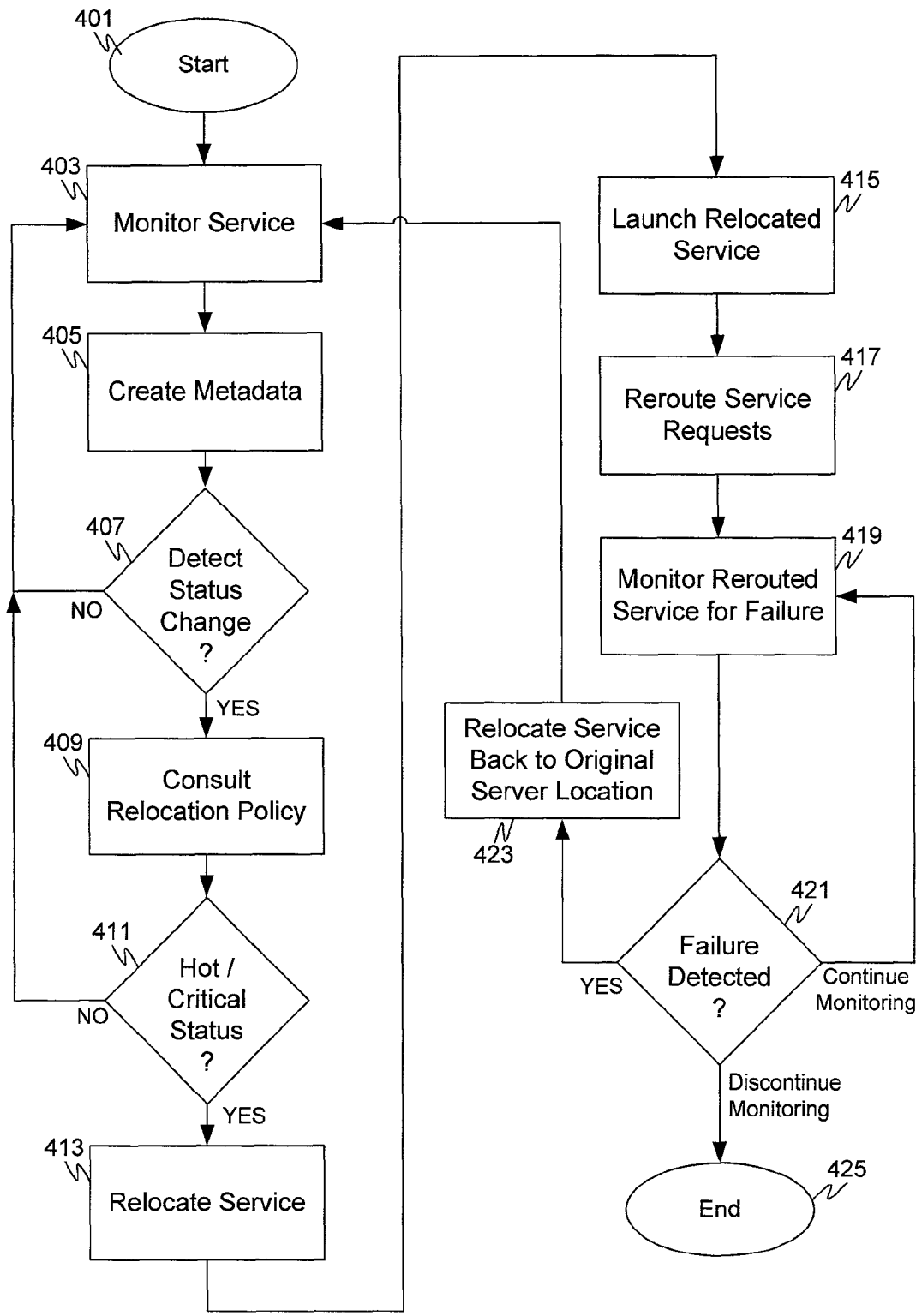
FIG. 4 is a flowchart of activities for practicing a method in accordance with various embodiments.

FIG. 4 is a flowchart 400 of activities for practicing a method in accordance with various embodiments. The method begins at 401 and proceeds to 403 to monitor the web service. This may be done, for example, by the service monitor 211 of FIG. 2 or other like device. The service monitor may be set up to take periodic readings of the web service usage or other parameters and record data of the readings. For example, metadata may be generated in block 405 based on the collected data. The metadata may be stored and/or transmitted it to another location for reporting or recording.

In block 407 it is determined whether a status change has occurred. A status change may occur if a threshold is exceeded by either exceeding a measurement or parameter a single time, or by exceeding the threshold for a predetermined period of time, by a predetermined number of instances, or by a predetermined amount. If it is determined in 407 that no threshold has been exceeded the method proceeds from 407 along the "NO" branch back to 403 to continue monitoring the web service. However, if block 407 determines that a threshold has been exceeded then the method proceeds from 407 along the "YES" branch to 409. In block 409 the relocation policy is consulted. In at least some embodiments the relocation policy may be maintained as unit 221 which is part of the OSCAR 213 relocation system of FIG. 2. The relocation policy contains rules for relocating a web service, and specifics as to how the relocation should be performed. Relocation policy may also contain the threshold amounts and parameter specifications in order to determine what action should be taken in relocating the web service.

Once the relocation policy has been consulted in 409 the method proceeds to 411 to determine whether a HOT or CRITICAL status has been generated. A HOT status may arise if the usage parameters exceed the predetermined HOT threshold, where the threshold is typically set based on the limits of the system or the level of usage that is efficient. A CRITICAL status may arise in the situation when the web service takes on an increased level of importance. The criticality of a web service may be defined based on its significance and relevance to the business or to an organization's objective in providing services. As part of the policy, the criticality can be specified and the relocation will consider critical services on priority for relocation when they become HOT. For example, the service may entail routing voice over Internet protocol (VOIP) telephone calls. However, if it is determined that a given telephone number involves an office emergency situation or other like function of importance (e.g., phone number of a sheriffs office) then the web service handling the VOIP call routing may be give a status of CRITICAL and considered for relocation. It may be the case that the status is merely WARM/NORMAL, in which case the web service will typically not yet be relocated. However, a status of CRITICAL may result in relocation irrespective of the web service's WARM/NORMAL status. Furthermore, various embodiments may alter the monitoring scheme to more frequently monitor the web service if a parameter is associated with a CRITICAL status. The system may also take preliminary steps towards relocating the web service if a WARM status is determined to prepare for relocation in the event the status goes to HOT or CRITICAL. If it is determined that the status is not HOT or CRITICAL the method proceeds from 411 along the "NO" path to 403 for further monitoring. However, if the status is HOT or CRITICAL the method proceeds from 411 along the "YES" path to 413.

In block 413 the web service is relocated to a new server. For example, in FIG. 2 the web service is relocated from current application server 207 to target application server 229. The relocation process may entail copying and/or moving files, applications, code or other logic to the new server. The relocation of the web service may be performed based upon instructions for the relocation contained in the relocation policy and without human intervention. Upon completing the web service relocation the method proceeds to block 415 to launch to relocated web service. In block 417 any ensuing web service requests are rerouted to the new server for execution. Typically, all requests are rerouted. However, some implementations may reroute only a portion of the requests for a period of time. Upon establishing the web service on the new server all requests may then be rerouted.

In block 419 the system monitors for web service failure at the new server. Since the likelihood of a failure may be higher initially due to some unforeseen circumstance the monitoring of block 419 may be performed more often or at a more detailed level than the maintenance monitoring of block 403. Block 421 determines whether a failure has occurred in the new server. If a failure occurs the method proceeds from 421 along the "YES" path to 423 to relocate the service back to the original server location. The method then proceeds to 403 to once again monitor the original server, for example, application server 207 of FIG. 2. In some embodiments, upon detecting a failure in 421 the web service may be moved to a third, different server rather than reverting back to the original server. Returning to block 421, if monitoring is to continue but no failure is detected the method proceeds from 421 along the "Continue Monitoring" path back to 419. Once a predefined period of time has passed or other criteria are met (e.g., a certain number of transactions have been performed) to discontinue monitoring the newly deployed web service without detecting any failure, then the method proceeds from 421 along the "Discontinue Monitoring" path to block 425, and ends.

Figure 5:
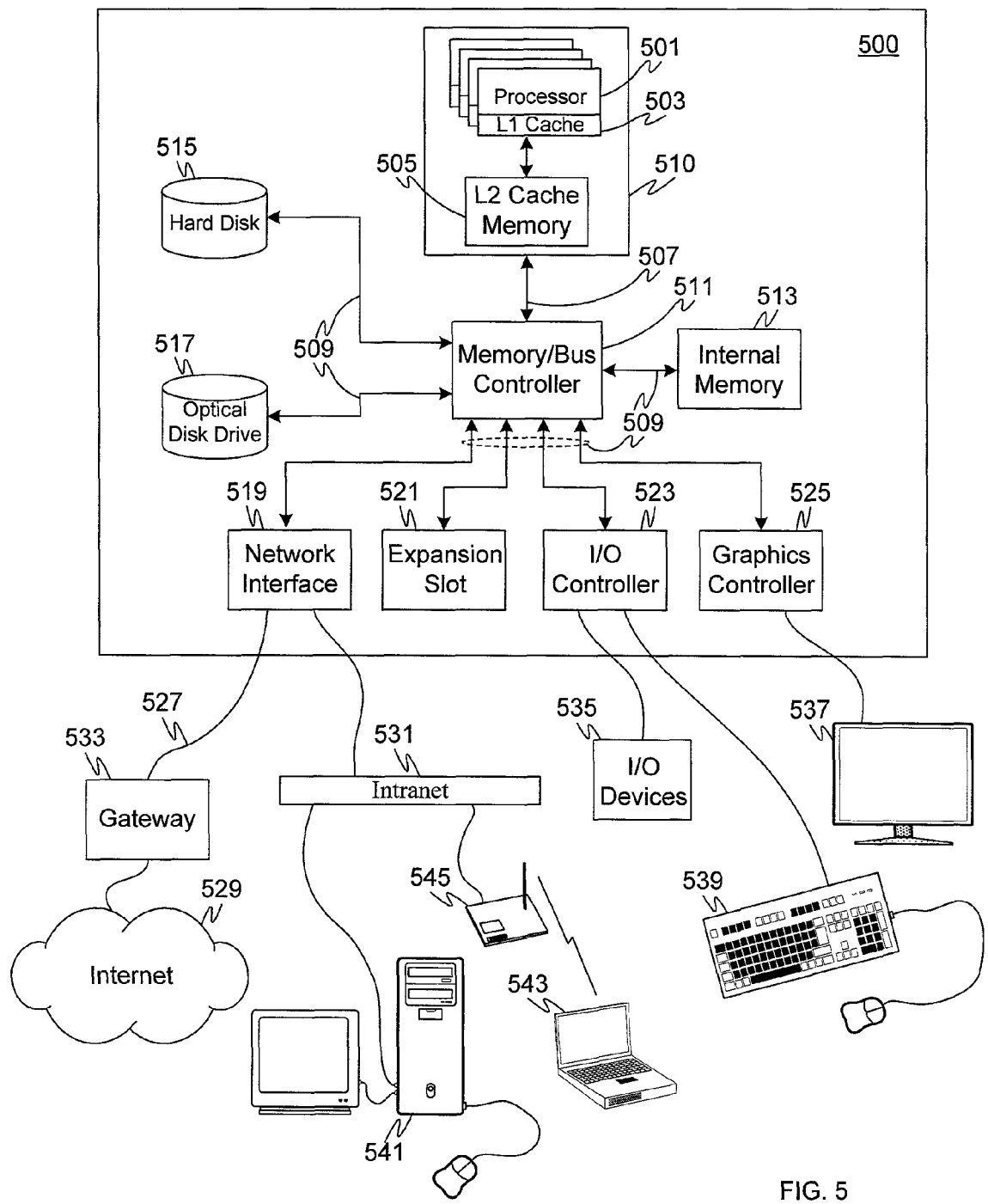
FIG. 5 depicts a computer system and various system components suitable for implementing the various embodiments.

FIG. 5 depicts a computer system 500 and various components suitable for implementing the various embodiments disclosed herein. The computer system 500 may be configured in the form of a desktop computer, a laptop computer, a mainframe computer, or any other hardware or logic arrangement capable of being programmed or configured to carry out instructions. The computer system 500 may be embodied as an admin server that performs various functions, activities and methods described above. In some embodiments the computer system 500 may act as a server, accepting inputs from a remote user over a local area network (LAN) 527, the Internet 529, or an intranet 531. In other embodiments, the computer system 500 may function as a smart user interface device for a server on the LAN 527 or over the Internet 529. The computer system 500 may be located and interconnected in one location, or may be distributed in various locations and interconnected via communication links such as a LAN 527 or a wide area network (WAN), via the Internet 529, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. Those of ordinary skill in the art may recognize that many different architectures may be suitable for the computer system 500, although only one typical architecture is depicted in FIG. 5.

Computer system 500 may include a processor 501 which may be embodied as a microprocessor, two or more parallel processors as shown in FIG. 5, a central processing unit (CPU) or other such control logic or circuitry. The processor 501 may be configured to access a local cache memory 503, and send requests for data that are not found in the local cache memory 503 across a cache bus to a second level cache memory 505. Some embodiments may integrate the processor 501, and the local cache 503 onto a single integrated circuit and other embodiments may utilize a single level cache memory or no cache memory at all. Other embodiments may integrate multiple processors 501 onto a single die and/or into a single package. Yet other embodiments may integrate multiple processors 501 with multiple local cache memories 503 with a second level cache memory 505 into a single package 510 with a front side bus 507 to communicate to a memory/bus controller 511. The memory/bus controller 511 may accept accesses from the processor(s) 501 and direct them to either the internal memory 513 or to the various input/output (I/O) busses 509. Some embodiments of the computer system 500 may include multiple processor packages 510 sharing the front-side bus 507 to the memory/bus controller. Other embodiments may have multiple processor packages 510 with independent front-side bus connections to the memory/bus controller. The memory bus controller may communicate with the internal memory 513 using a memory bus 509.

The internal memory 513 may include one or more of random access memory (RAM) devices such as synchronous dynamic random access memories (SDRAM), double data rate (DDR) memories, or other volatile random access memories. The internal memory 513 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the computer system 500 may also include $3^{rd}$ level cache memory or a combination of these or other like types of circuitry configured to store information in a retrievable format. In some implementations the internal memory 513 may be configured as part of the processor 501, or alternatively, may be configured separate from it but within the same package 510. The processor 501 may be able to access internal memory 513 via a different bus or control lines than is used to access the other components of computer system 500.

The computer system 500 may also include, or have access to, one or more hard drives 515 (or other types of storage memory) and optical disk drives 517. Hard drives 515 and the optical disks for optical disk drives 517 are examples of machine readable (also called computer readable) mediums suitable for storing the final or interim results of the various embodiments. The optical disk drives 517 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 500 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable or machine readable storage medium.

The computer system 500 may either include the hard drives 515 and optical disk drives 517 as an integral part of the computer system 500 (e.g., within the same cabinet or enclosure and/or using the same power supply), as connected peripherals, or may access the hard drives 515 and optical disk drives 515 over a network, or a combination of these. The hard drive 515 often includes a rotating magnetic medium configured for the storage and retrieval of data, computer programs or other information. In some embodiments, the hard drive 515 may be a solid state drive using semiconductor memories. In other embodiments, some other type of computer useable medium may be used. The hard drive 515 need not necessarily be contained within the computer system 500. For example, in some embodiments the hard drive 515 may be server storage space within a network that is accessible to the computer system 500 for the storage and retrieval of data, computer programs or other information. In some instances the computer system 500 may use storage space at a server storage farm, or like type of storage facility, that is accessible by the Internet 529 or other communications lines. The hard drive 515 is often used to store the software, instructions and programs executed by the computer system 500, including for example, all or parts of the computer application program for carrying out activities of the various embodiments.

The communication link 509 may be used to access the contents of the hard drives 515 and optical disk drives 517. The communication links 509 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller may also provide other I/O communication links 509. In some embodiments, the links 509 may be a shared bus architecture such as peripheral component interface (PCI), microchannel, industry standard architecture (ISA) bus, extended industry standard architecture (EISA) bus, VERSAmoduleEurocard (VME) bus, or any other shared computer bus. In other embodiments, the links 509 may be a point-to-point link such as PCI-Express, HyperTransport, or any other point-to-point I/O link. Various I/O devices may be configured as a part of the computer system 500.

In many embodiments, a network interface 519 may be included to allow the computer system 500 to connect to a network 527 or 531. Either of the networks 527 and 531 may operate in accordance with standards for an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A network gateway 533 or router, which may be a separate component from the computer system 500 or may be included as an integral part of the computer system 500, may be connected to the networks 527 and/or 531 to allow the computer system 500 to communicate with the Internet 529 over an internet connection such as an asymmetric digital subscriber line (ADSL), data over cable service interface specification (DOCSIS) link, T1 or other internet connection mechanism. In other embodiments, the computer system 500 may have a direct connection to the Internet 529. The computer system 500 may be connected to one or more other computers such as desktop computer 541 or laptop computer 543 via the Internet 529, an intranet 531, and/or a wireless node 545. In some embodiments, an expansion slot 521 may be included to allow a user to add additional functionality to the computer system 500.

The computer system 500 may include an I/O controller 523 providing access to external communication interfaces such as universal serial bus (USB) connections, serial ports such as RS-232, parallel ports, audio in and audio out connections, the high performance serial bus IEEE-1394 and/or other communication links. These connections may also have separate circuitry in some embodiments, or may be connected through a bridge to another computer communication link provided by the I/O controller 523. A graphics controller 525 may also be provided to allow applications running on the processor 501 to display information to a user. The graphics controller 525 may output video through a video port that may utilize a standard or proprietary format such as an analog video graphic array (VGA) connection, a digital video interface (DVI), a digital high definition multimedia interface (HDMI) connection, or any other video connection. The video connection may connect to display 537 to present the video information to the user.

The display 537 may be any of several types of displays or computer monitors, including a liquid crystal display (LCD), a cathode ray tube (CRT) monitor, on organic light emitting diode (OLED) array, or other type of display suitable for displaying information for the user. The display 537 may include one or more light emitting diode (LED) indicator lights, or other such display devices. Typically, the computer system 500 includes one or more user input/output (I/O) devices such as a keyboard and mouse 539, and/or other means of controlling the cursor represented including but not limited to a touchscreen, touchpad, joystick, trackball, tablet, or other device. The user I/O devices 535 may connect to the computer system 500 using USB interfaces or other connections such as RS-232, PS/2 connector or other interfaces. Various embodiments include input devices configured to accept an input from a user and/or provide an output to a user. For example, some embodiments may include a webcam (e.g., connect via USB), a microphone (e.g., connected to an audio input connection), and/or speakers (e.g., connected to an audio output connection). The computer system 500 typically has a keyboard and mouse 539, a monitor 537, and may be configured to include speakers, microphone, and a webcam. These input/output devices may be used in various combinations, or separately, as means for presenting information to the user and/or receiving information and other inputs from a user to be used in carrying out various programs and calculations. Speech recognition software may be used in conjunction with the microphone to receive and interpret user speech commands.

The computer system 500 may be suitable for use in identifying critical web services and dynamically relocating them to a new server. For example, the processor 501 may be embodied as a microprocessor, microcontroller, DSP, RISC processor, two or more parallel processors, or any other type of processing unit that one of ordinary skill would recognize as being capable of performing or controlling the functions, steps, activities and methods described herein. A processing unit in accordance with at least one of the various embodiments can operate computer software programs stored (embodied) on computer-readable medium such those compatible with the disk drives 515, the optical disk drive 517 or any other type of hard disk drive, floppy disk, flash memory, ram, or other computer readable medium as recognized by those of ordinary skill in the art.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module," "logic" or "system." Furthermore, aspects of the various embodiments may take the form of a computer program product embodied in one or more computer readable medium(s) having computer readable program code stored thereon.

Any combination of one or more non-transitory computer readable medium(s) may be utilized. The computer readable medium is typically a computer readable storage medium. A computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations and aspects of the various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus, systems, and computer program products according to various embodiments disclosed herein. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, a programmable data processing apparatus, or other such devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur in an order other that that depicted in the figures. For example, two blocks shown in succession may, in fact, be executed substantially concurrently, or the blocks and activities of the figures may sometimes be executed in reverse order or in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining", as used herein and in the claims, may mean either retrieving from a computer readable storage medium, receiving from another computer program, receiving from a user, calculating based on other input, or any other means of obtaining a datum or set of data. The term "plurality", as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not be included in the "plurality" and are not, therefore, referred to by "each."

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

What is claimed is:

1. A computer implemented method of relocating a web service, comprising:

defining and storing a relocation policy that includes instructions on moving the web service and defines parameters of the web service executing on a first server connected to a network, wherein said instructions specify a second server as a new location for the web service;

monitoring the parameters of the web service executing on the first server, wherein the web service is an application function configured to be a reusable component in a business process;

detecting a status change based on a change in the parameters;

consulting said relocation policy for the instructions on moving the web service in response to detecting the status change;

relocating the web service without human intervention to the second server which is connected to the network; and rerouting requests for the web service;

wherein the first and second servers are both physical application servers configured to provide logic for executing the web service; and wherein the requests are requests received over the network from a client computer program for the web service.

2. The method of claim 1, wherein said relocation policy indicates files to be copied to the second server as part of relocating the web service to the second server, and wherein said parameters are based on quality of service (QOS) parameters and service level agreements (SLA), the method further comprising:

identifying whether the web service is relocatable using a service analyzer component; and determining resources to be relocated to the second server;

wherein the status change is based on a change in a usage level threshold being exceeded by a predefined amount, the usage level being defined by said parameters; and wherein the detecting of said status change further comprises receiving metadata associated with the parameters.

3. The method of claim 1, wherein the status change is a first status change from a normal status level to a first status level and the change in the parameters is a first change in the parameters, the method further comprising:

detecting a second status change from the first status level to a second status level based on a second change in the parameters; and initiating activities for the relocating of the web service to said second server in response to the second status change to said second status level;

wherein the consulting of the relocation policy in performed in response to the first status change to said first status level.

4. The method of claim 3, wherein the detecting of the first status change is based on said parameters exceeding a first threshold, the method further comprising:

detecting of the second status change based on said parameters exceeding a second threshold.

5. The method of claim 1, further comprising:

monitoring the web service executing on the second server; and reverting to execution of the web service on the first server in response to detecting a failure of the web service executing on the second server.

6. The method of claim 1, wherein the relocating of the web service to said second server is performed by an optimized composer and relocator unit, and wherein said relocation policy is included as part of said optimized composer and relocator unit, the method further comprising:

using the optimized composer and relocator unit to identify optimized relocation methods and a set of required resources including required classes associated with the web service; and creating an optimized relocatable bundle that packages the required classes with said optimized relocation methods to run said web service upon being relocated to the second server.

7. A server system including a plurality of servers, comprising:

a network connecting the plurality of servers;

a first server of the plurality of servers on which is deployed a web service, wherein the web service is an application function configured to be a reusable component in a business process;

a second server of the plurality of servers suitable for executing the web service;

a memory configured to store a relocation policy with instructions on moving the web service without human intervention in response to detection of a status change, wherein said relocation policy is configured to accept inputs defining and storing parameters of the web service, said instructions, and a location of said second server, said relocation policy specifying the second server as a new source for the web service and indicating files to be copied to the second server as part of relocating the web service to the second server; and an admin server of the plurality of servers connected to said memory and being configured to monitor said parameters of the web service executing on the first server;

wherein, in response to detecting the status change based on a change in the parameters the admin server is configured to consult the relocation policy for said instructions and relocate the web service to said second server which is connected to the network by storing the files of the web service on the second server, the admin server further being configured to redeploy the web service to the second server by rerouting requests from a client computer program for the web service to the second server;

wherein the first and second servers are both physical application servers configured to provide logic for executing the web service; and wherein the requests are requests received over the network from the client computer program for the web service.

8. The server system of claim 7, the system further comprising:

a service analyzer component stored in a non-transitory machine readable medium and configured to identify whether the web service is relocatable;

wherein said parameters are based on quality of service (QoS) parameters and service level agreements (SLA);

wherein the status change is based on a change in the usage level threshold being exceeded by a predefined amount; and wherein the detecting of said status change is based upon receiving metadata associated with the parameters.

9. The server system of claim 7, wherein the status change is a first status change from a normal status level to a first status level and the change in the parameters is a first change in the parameters; and wherein the admin server is configured to perform activities including detect a second status change from the first status level to a second status level based on a second change in the parameters, and initiate activities for the relocating of the web service to said second server in response to the second status change to said second status level, wherein the consulting of the relocation policy in performed in response to the first status change to said first status level.

10. A software product comprising a non-transitory machine readable medium including a program of instructions for relocating a web service, wherein the program of instructions upon being executed on a computer causes the computer to perform activities comprising:

define and storing a relocation policy that includes instructions on moving the web service and defines parameters of the web service executing on a first server connected to a network, wherein said instructions specify a second server as a new location for the web service monitor the parameters of the web service executing on the first server, wherein the web service is an application function configured to be a reusable component in a business process;

detect a status change based on a change in the parameters;
consult the relocation policy for instructions on moving the web service in response to the status change, wherein said relocation policy specifies the second server as the new location for the web service and indicates files to be copied to the second server as part of relocating the web service to the second server;
relocate the web service without human intervention to the second server which is connected to the network; and
reroute requests for the web service to the second server;
wherein the first and second servers are both physical application servers configured to provide logic for executing the web service; and
wherein the requests are requests received over the network from a client computer program for the web service.

11. The software product of claim 10, wherein said relocation policy indicates files to be copied to the second server as part of relocating the web service to the second server, and wherein said parameters are based on quality of service (QOS) parameters and service level agreements (SLA), the activities further comprising:
identify whether the web service is relocatable using a service analyzer component; and
determine resources to be relocated to the second server;
wherein the status change is based on a change in a usage level threshold being exceeded by a predefined amount, the usage level being defined by said parameters; and
wherein the detecting of said status change further comprises receiving metadata associated with the parameters.

12. The software product of claim 10, wherein the status change is a first status change from a normal status level to a first status level and the change in the parameters is a first change in the parameters, the activities further comprising:
detect a second status change from the first status level to a second status level based on a second change in the parameters; and
initiate activities for the relocating of the web service to said second server in response to the second status change to said second status level;
wherein the consulting of the relocation policy in performed in response to the first status change to said first status level.

13. The software product of claim 10, the activities further comprising:
monitor the web service executing on the second server; and
revert to execution of the web service on the first server in response to detecting a failure of the web service executing on the second server.

14. The software product of claim 10, the activities further comprising:
use an optimized composer to identify optimized relocation methods and a set of required resources including required classes associated with the web service; and
create an optimized relocatable bundle that packages the required classes with said optimized relocation methods to run said web service upon being relocated to the second server.

* * * * *